United States Patent
Kraft et al.

(10) Patent No.: US 10,408,364 B2
(45) Date of Patent: Sep. 10, 2019

(54) VALVE DRIVE WITH POSITION SENSOR

(71) Applicant: Buerkert Werke GmbH, Ingelfingen (DE)

(72) Inventors: Manuel Kraft, Karlsruhe (DE); Peter Krippner, Karlsruhe (DE)

(73) Assignee: BUERKERT WERKE GMBH (DE)

( * ) Notice: Subject to any disclaimer, the term of this patent is extended or adjusted under 35 U.S.C. 154(b) by 206 days.

(21) Appl. No.: 15/367,225

(22) Filed: Dec. 2, 2016

(65) Prior Publication Data

US 2017/0159846 A1 Jun. 8, 2017

(30) Foreign Application Priority Data

Dec. 3, 2015 (DE) .................. 10 2015 121 047

(51) Int. Cl.
*F16K 37/00* (2006.01)
*F16K 31/122* (2006.01)

(52) U.S. Cl.
CPC ........ *F16K 37/0041* (2013.01); *F16K 31/122* (2013.01)

(58) Field of Classification Search
None
See application file for complete search history.

(56) References Cited

U.S. PATENT DOCUMENTS

| | | | |
|---|---|---|---|
| 6,293,303 B1* | 9/2001 | Mori | F01L 1/46 123/90.11 |
| 7,834,527 B2* | 11/2010 | Alvarez Icaza Rivera | H01L 41/0478 310/344 |
| 8,860,336 B2 | 10/2014 | Anderson et al. | |
| 2009/0236939 A1* | 9/2009 | Heim | F04B 43/0054 310/324 |
| 2014/0291677 A1* | 10/2014 | Le Neel | H01L 25/0652 257/48 |

FOREIGN PATENT DOCUMENTS

| | | |
|---|---|---|
| DE | 20311126 U1 | 9/2003 |
| DE | 202004020347 U1 | 6/2005 |
| DE | 112013004893 T5 | 6/2015 |
| WO | 2014123431 A2 | 8/2014 |
| WO | 2014/204323 A1 | 12/2014 |

* cited by examiner

*Primary Examiner* — Mary E McManmon
*Assistant Examiner* — Angelisa L. Hicks
(74) *Attorney, Agent, or Firm* — Dilworth IP, LLC

(57) ABSTRACT

The present invention relates to a valve drive for actuating a valve, including a lifting element which shifts upon an actuation of the valve, and a displacement sensor by means of which the position of the lifting element can be detected, characterized in that the displacement sensor includes an elastically deformable dielectric film which is provided with at least two electrodes, the film being deformed by an adjustment of the lifting element.

14 Claims, 15 Drawing Sheets

VALVE DRIVE WITH POSITION SENSOR

The present invention relates to a valve drive for actuating a valve.

TECHNICAL FIELD OF THE INVENTION

Valve drives are known which include a lifting element which shifts upon an actuation of the valve, and a displacement sensor by means of which the position of the lifting element can be detected.

A valve drive of this type may more particularly be part of a process valve by means of which a flow cross-section for a gaseous or liquid medium can be closed and can be exposed in a controlled manner. For adjusting the valve element, the valve drive may include, for example, a pneumatically actuated piston, an electromagnetic drive or else a linear drive in which the rotary motion of a motor is converted to a translational motion by means of a spindle.

With many of these valves it is desirable for the position of the valve element to be known. To this end, a displacement sensor may be used, by means of which the movement of a component is detected, which directly or indirectly allows a conclusion to be drawn as to the position of the valve element. This component will be referred to as lifting element below.

Examples of displacement sensors that are used in valve drives for process valves include magnetic scales the position of which is read out by a sensor, or a sensor coil by means of which the position of a so-called target is detected.

A drawback of the known displacement sensors is that the overall volume thereof is relatively large. This results in that the overall volume of the valve drives in which they are employed is also relatively large. This concerns in particular the overall height as measured parallel to the adjustment direction of the lifting element; since the displacement sensor generally has to be distinctly longer than the maximum travel to be detected, the result is a comparatively large overall height.

The object of the invention is to provide a valve drive having a displacement sensor which distinguishes itself by a compact design and a flexible structure.

BRIEF DESCRIPTION OF THE INVENTION

To achieve this object, according to the invention provision is made in a valve drive of the type initially mentioned that the displacement sensor includes an elastically deformable dielectric film which is provided with at least two electrodes, the film being deformed by an adjustment of the lifting element. The basic idea of the invention resides in using an elastically deformable capacitor as the central component of the displacement sensor. Such a capacitor is very compact and, since it is elastically deformable, it can be mounted very flexibly to the valve drive within the installation space available.

In simplified terms, such an elastically deformable capacitor is constructed in such a manner that the dielectric, elastically deformable film has at least two electrodes applied thereon, which are also deformable. As a simple example, a rectangular, elongated film strip may be assumed which is coated with an electrode on each of its upper and lower surfaces. As a result, a capacitor is formed between the electrodes. When the film strip is stretched, the distance of the electrodes from each other will change. Specifically, the distance between the electrodes is reduced, and the capacitor surface will become larger since the total volume of the dielectric film remains constant and, therefore, the distance between its upper and lower surfaces necessarily becomes smaller when it is elongated. The change in capacitance resulting from a deformation of the film can be detected and a conclusion can be drawn from this about the adjustment of the lifting element provided that the relationship between the deformation of the dielectric film by the travel of the lifting element and the change in capacitance of the capacitor is known.

Examples of such dielectric capacitors and the evaluation of the changes in their capacitances may be found, for instance, in WO 2014/204323 A1 and in U.S. Pat. No. 8,860,336 B2.

There are various possible ways of arranging the film, depending on the amount of the travel of the lifting element and on the space available on the valve drive. For example, the film may be firmly clamped at one end and coupled to the lifting element at the other end. It is also possible for the film to be firmly clamped at both ends and for the lifting element to engage the film between the ends thereof. It is also possible for the film to be firmly clamped along its periphery and for the lifting element to engage the film inside the periphery thereof. Depending on the positions of the ends of the film or the position of the periphery of the film relative to the lifting element and in particular relative to one of the two end positions, the curve of travel versus relative deformation of the film can be adjusted such that the resolution obtained in a range of travel that is of particular interest in terms of operation of the valve is higher than that in other ranges. For instance, the film may be arranged such that it is stretched by the lifting element to a disproportionate degree in the vicinity of one of the end positions, so that the displacement sensor has a higher resolution there than in the vicinity of the other end position.

According to one configuration of the invention, provision is made for a force transmission element which engages only one side of the film. In this configuration, the force transmission element pushes against the film such that the latter is held taut at all times.

The force transmission element may, for example, be a rotatable roller which engages one side of the film, for example the lower surface, and stretches the latter when the valve is actuated in one direction. When the valve is actuated in the other direction, the film will elastically contract, so that it continues to rest against the force transmission element at all times.

The force transmission element may also be a needle which engages an abutment connected with the film. The needle bearing formed in this way ensures that the lifting element cannot apply any undesirable tilting or rotary motions on the film, which would lead to a faulty measurement.

Provision may also be made for a force transmission element which has the film clamped thereto. This allows the film to be actively adjusted in two directions.

According to one configuration of the invention, provision is made that the force transmission element is mounted to the lifting element. In this configuration, a very compact design is obtained since the lifting element deforms the film directly.

It may also be provided that the force transmission element is mounted to a deflection lever. This allows the travel of the lifting element to be geared up or down in the desired manner.

Preferably, here the deflection lever has a slide arranged thereon which cooperates with the lifting element, so that the adjusting movement of the lifting element is precisely transferred to the deflection lever.

It may also be provided that the force transmission element is a translationally adjustable carriage. Here, the adjustable end of the film is guided separately and the adjusting movement of the lifting element is directly or indirectly transferred to the carriage.

According to a preferred embodiment, an anti-rotation device is provided for the force transmission element. The anti-rotation device ensures that when the lifting element is adjusted, the film will not also be stretched additionally as caused by rotation of the force transmission element; such a rotation would distort the measuring signal and lead the user to believe that the travel of the lifting element is larger or smaller than is actually the case.

The anti-rotation device may directly engage the force transmission element. Alternatively, it is also possible for the anti-rotation device to engage the lifting element, so that the force transmission element is indirectly prevented from rotating in an undesirable manner.

According to one configuration of the invention, provision is made that the film is arranged substantially parallel to the direction of adjustment of the lifting element. This allows the use of a linear relationship between the travel of the lifting element and the elongation of the film.

As an alternative, it may be provided that the film is arranged obliquely to the direction of adjustment of the lifting element. In this configuration, a nonlinear relationship between the travel of the lifting element and the elongation of the film can be set.

To contact the electrodes applied on the film, provision is made for a plug which, depending on the installation situation, may extend substantially at right angles to the direction of adjustment of the lifting element or else substantially parallel to the direction of adjustment of the lifting element. One example of such a plug may be found in WO 2014/123431 A2.

The displacement sensor may be directly integrated into an actuator, that is, into a pneumatic cylinder or a linear drive, for example. It is also possible for the displacement sensor to be at least partly arranged inside a control head, which constitutes the valve drive together with the actuator.

The lifting element may be an extension of a valve spindle, for example, with the film being arranged inside the control head. In this embodiment, the displacement sensor is arranged at the location where the displacement sensor has been usually arranged hitherto, viz. inside the control head. Thus, a minimum amount of modification is required.

Provision may also be made that the lifting element is a valve spindle and one end of the film is coupled to the valve spindle inside the actuator. This saves on installation space within the control head.

Provision may also be made that the lifting element is a piston which is arranged inside the actuator, and that the film is arranged on the outside of the valve drive. This solution can be retrofitted involving comparatively little effort since it requires, at most, a minimum of modification with regard to the actuator.

It may be provided that one end of the film is fastened to a carriage which is magnetically coupled to the piston. This solution distinguishes itself in that no extension is required on the side of the piston facing away from the valve element.

A guide may be provided for the carriage, by which the carriage is guided on the outer surface of the actuator. Such a guide may be retrofitted with little effort.

It may also be provided that the lifting element is part of a linear drive, which is adjusted by a drive motor. The lifting element may be a screw drive, for example, which is translationally adjusted by a spindle nut.

BRIEF DESCRIPTION OF THE DRAWINGS

The invention will now be described below with reference to a variety of embodiments which are illustrated in the accompanying drawings, in which.

DETAILED DESCRIPTION OF THE INVENTION

Figure 1:
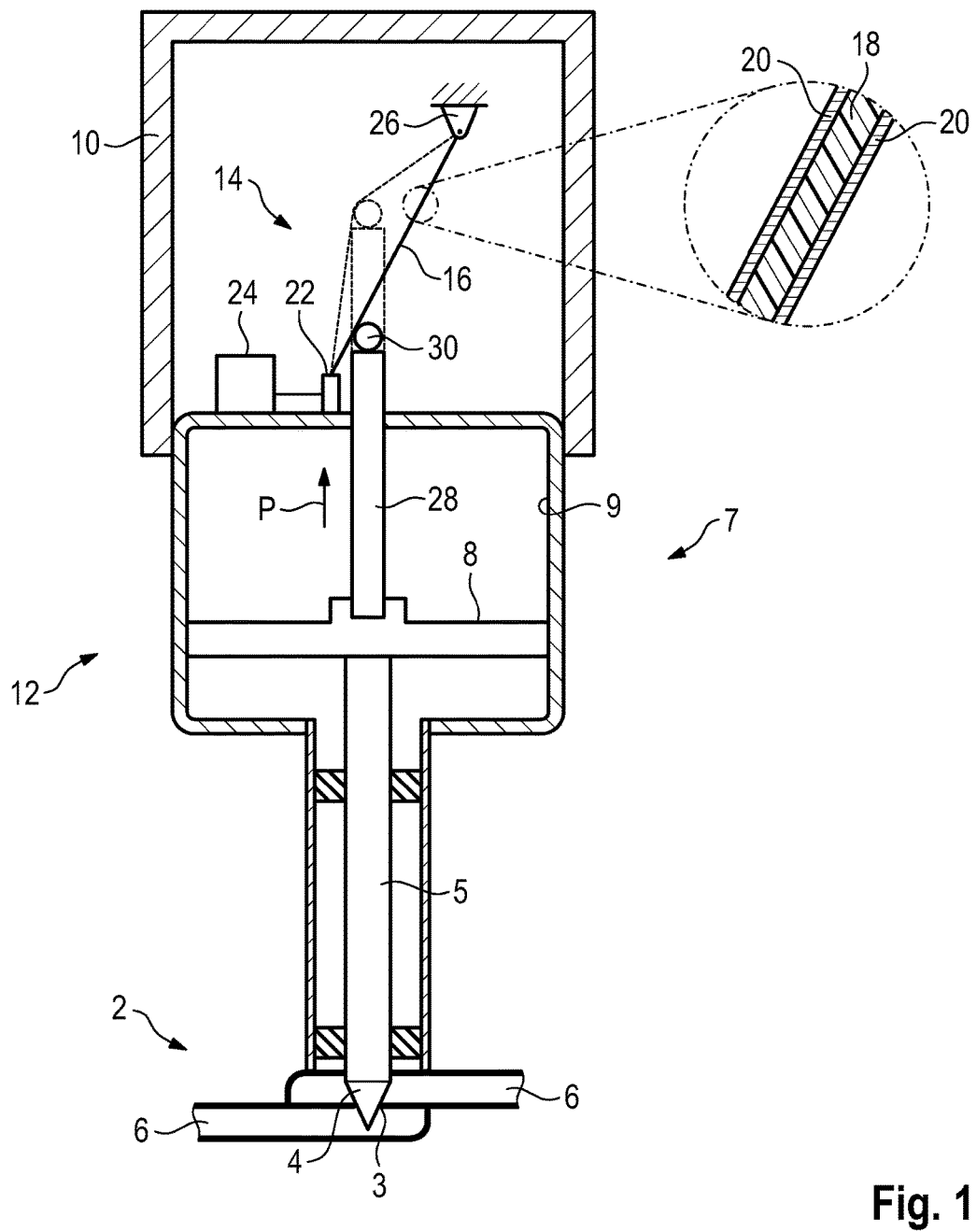
FIG. 1 shows a schematic section of a valve drive according to a first embodiment of the invention.

FIG. 1 schematically shows a valve 2 which includes a valve seat 3 and a valve element 4. The valve element is mounted to a valve spindle 5 and can be adjusted by the latter relative to the valve seat 3, so that the valve seat is either closed or opened to varying degrees. This causes a flow cross-section between two valve ports 6 to be either blocked or exposed to a greater or lesser extent.

The valve spindle 5 may be adjusted by an actuator 7, which here contains a piston 8 which is adjustable within a cylinder 9. The actuator 7, together with a control head 10 schematically indicated here, forms a valve drive 12.

In order to be able to detect the adjustment of the valve element 4, the valve drive 12 is provided with a displacement sensor 14.

A central component included in the displacement sensor 14 is an elastically deformable capacitor 16 which consists of a film 18 and two electrodes 20.

Suitable materials for the dielectric film 18 include, for example, a polymer, a silicone, an acrylate or PU.

In the first embodiment, the film 18 has an elongated, rectangular shape. Suitable lengths are on the order of between 2 cm and 20 cm. The width of the film may be on the order of a few millimeters up to several centimeters. The thickness of the film amounts to between 10 μm and 100 μm, for example.

The electrodes 20 are arranged on the upper surface and the lower surface of the film 18. They may, for example, consist of soot, carbon nanotubes, conductive polymers, nanowires or a mixture of these materials. These materials ensure that the electrical conductivity of the electrodes is maintained even over a large number of deformation cycles and that a mechanical deformation of the dielectric is affected to a minor degree, if at all.

The electrodes may extend over the entire upper and lower surfaces of the film 18. But it is also possible to use only partial electrodes on the upper and lower surfaces. Electrodes that overlap each other in a comb-like manner, for example, may also be used on only one side of the film. What is important is that the electrodes are arranged such that upon an elongation of the film, a change in capacitance of the capacitor formed is obtained.

An essential feature of the capacitor 16 is that it is capable of being elastically stretched to a substantial degree. It is possible, for example, that the capacitor can be elongated by 50% to 100% of its length and, thereafter, when the external forces decrease again, it will elastically return to its original shape. Here, the electrodes 20 are configured such that they follow the deformations of the film.

Since the dielectric film 18 is incompressible, in particular the thickness of the film will decrease when it is stretched. In the process, the distance between the two electrodes 20 is reduced so that the capacitance of the capacitor formed of the film 18 and the electrodes 20 will also change.

In the embodiment shown, the capacitor 16 is fixedly arranged with its two ends inside the control head 10. A plug 22 is provided at one end, the plug mechanically fixing the lower end of the capacitor 16 in place here. The plug 22 also serves to electrically contact the two electrodes 20, so that the capacitance of the capacitor 16 can be measured by means of a controller 24.

The other end of the capacitor 16, in this case the upper end, is fixedly held at a suspension point 26 inside the control head 10.

The capacitor 16 is engaged by a lifting element 28 which is firmly connected with the piston 8 and is therefore adjusted together with the valve spindle 5 and the valve element 4. At its end facing away from the piston 8, the lifting element 28 is provided with a force transmission element 30.

The force transmission element 30 is in the form of a roller here.

The capacitor 16 is arranged inside the control head 10 in such a way that any change in position of the valve element 4 results in a change in the length of the capacitor 16 and thus in a change in the capacitance thereof.

When, starting from the position shown in FIG. 1, the valve element 4 is opened, the lifting element 28 is moved upward in the direction of the arrow P. In the process, the capacitor 16 is elongated more and more since the force transmission element 30 pushes the capacitor 16 up from the lower surface thereof, causing the overall distance from the plug 22 via the force transmission element 30 up to the suspension point 26 to become longer and longer the higher up the force transmission element 30 is located.

The controller 24 can measure the capacitance of the capacitor 16 and draw a conclusion from the capacitance about the length or extent of the elongation of the capacitor 16. This, in turn, allows the position of the valve element 4 to be derived.

It can be seen that the characteristic curve of the sensor element, i.e. the signal change as a function of the distance traveled by the valve element, can be influenced by the configuration of the mechanical system surrounding the sensor element. In the example shown, the displacement sensor 14 has a higher resolution in the area of the upper end position of the valve element 4 than in the area of the lower end position. This is due to the fact that an adjustment of the valve element by a small unit distance traveled results in an elongation that is very much smaller in the area of the lower end position than that in the area of the upper end position.

The valve 2 shown in the first embodiment is only used by way of example here. Other types of valves may be used.

The actuator 7 is also just exemplary here; the valve element may be adjusted translationally in other ways.

Usually, further circuits and/or ports of the valve drive 12 are provided inside the control head 10, which are not illustrated here in FIG. 1 for the sake of greater clarity.

Figure 2:
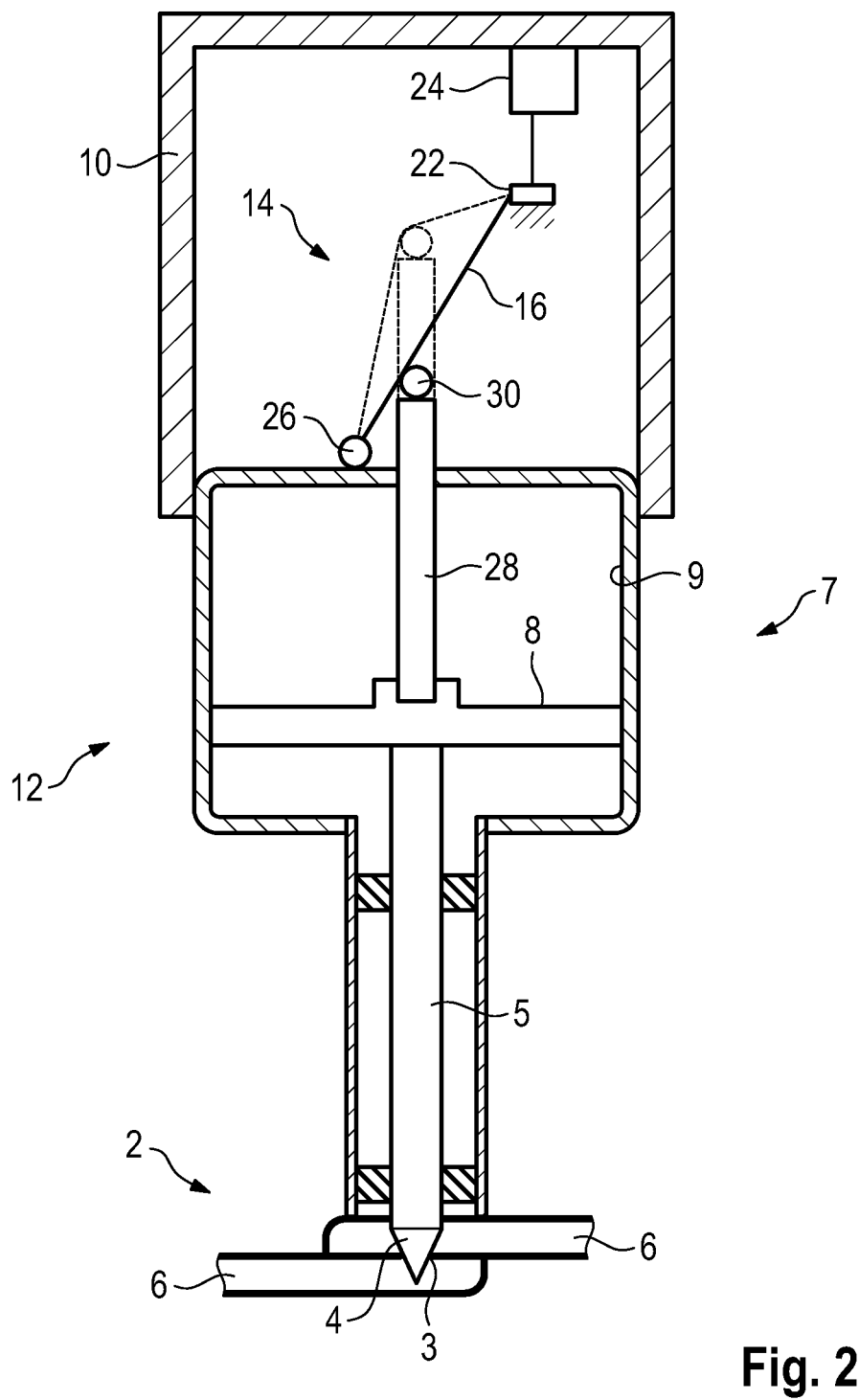
FIG. 2 shows a schematic section of a valve drive according to a second embodiment of the invention.

FIG. 2 shows a second embodiment. The same reference numbers are used for the parts known from the first embodiment, and reference is made to the above explanations in this respect.

The essential difference between the first and second embodiments consists in that in the second embodiment, the resolution of the displacement sensor 14 in the area of the upper end position is even higher than that in the first embodiment. This is caused by the fact that in the second embodiment, the upper end of the capacitor 16 is arranged below the level at which the force engagement element is positioned when in the upper end position. This results in that in this operating range, the capacitor 16 is stretched by more than one unit distance when the force transmission element 30 is adjusted by one unit distance. If the plug 22 were to be arranged closer to the lifting element 28, the capacitor 16 could, in the area of the upper end position, extend around the force transmission element 30 and the lifting element 28 in a U-shape with two layers that are parallel to each other, so that an adjustment of the lifting element by one unit distance would result in the capacitor 16 being stretched by two units distance.

A comparison of FIGS. 1 and 2 reveals that the plug 22 is arranged horizontally, that is, the capacitor 16 leaves the plug 22 horizontally and thus perpendicularly to the direction of adjustment of the lifting element 28. In the first embodiment, on the other hand, the plug 22 is arranged vertically, so that the capacitor 16 leaves the plug 22 vertically upward and thus parallel to the direction of adjustment of the lifting element 28.

The comparison of FIGS. 1 and 2 further reveals that the positions of the plug 22 and the suspension point 26 relative to each other are interchanged.

The orientation of the plug 22 relative to the adjustment direction of the lifting element 28 and also the arrangement of the suspension point 26 relative to the plug 22 may each be suitably selected depending on the specific design situation.

Figure 3:
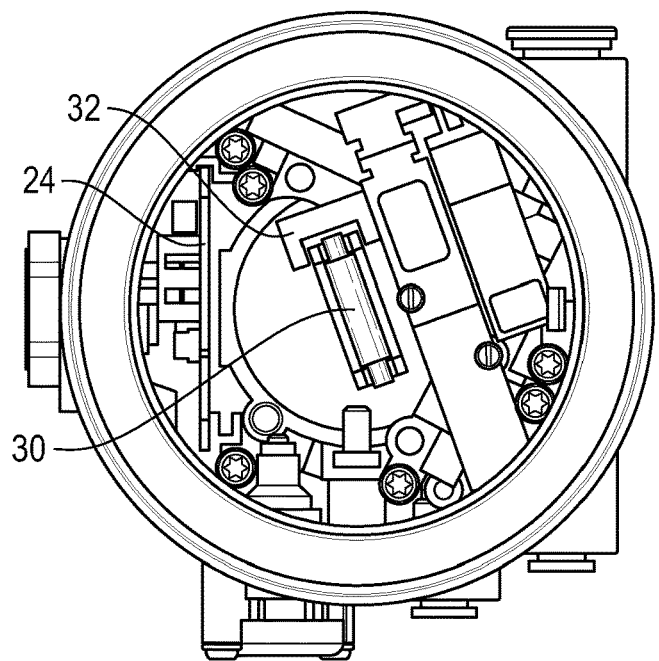
FIG. 3 shows a top view of a valve drive, the dielectric film not being illustrated.

FIG. 3 shows a top view of the control head 10 of FIGS. 1 and 2. The capacitor 16 is not illustrated here for the sake of greater clarity. The force transmission element 30 can be clearly seen here, which is in the form of a roller supported on both sides here. Various other components that are arranged inside the control head 10 are also clearly visible.

Figure 4:
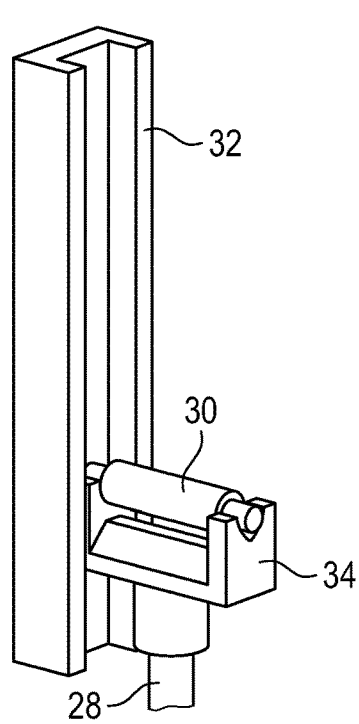
FIG. 4 shows a schematic view of a lifting element together with a force transmission element and an anti-rotation device mounted thereto, in a first position.
Figure 5:
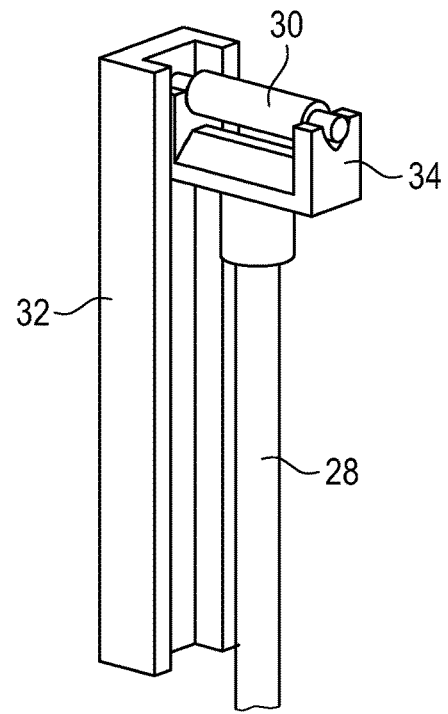
FIG. 5 shows the lifting element of FIG. 4 in a second position.

FIGS. 3 to 5 also show an anti-rotation device 32 which here engages the force transmission element 30, more precisely a bearing fork 34 of the force transmission element 30. The anti-rotation device 32 is configured as a guide rail here which extends in a straight line and has one end of the bearing fork 34 laterally received therein. This ensures that the force transmission element 30 can not rotate about the central axis of the lifting element 28. In fact, such a rotation would lead to an undesirable elongation of the capacitor 16.

Differing from the embodiment shown, the anti-rotation device may also directly engage the lifting element 28. The latter could have a lateral groove, for example, in which a guide pin engages.

Figure 6:
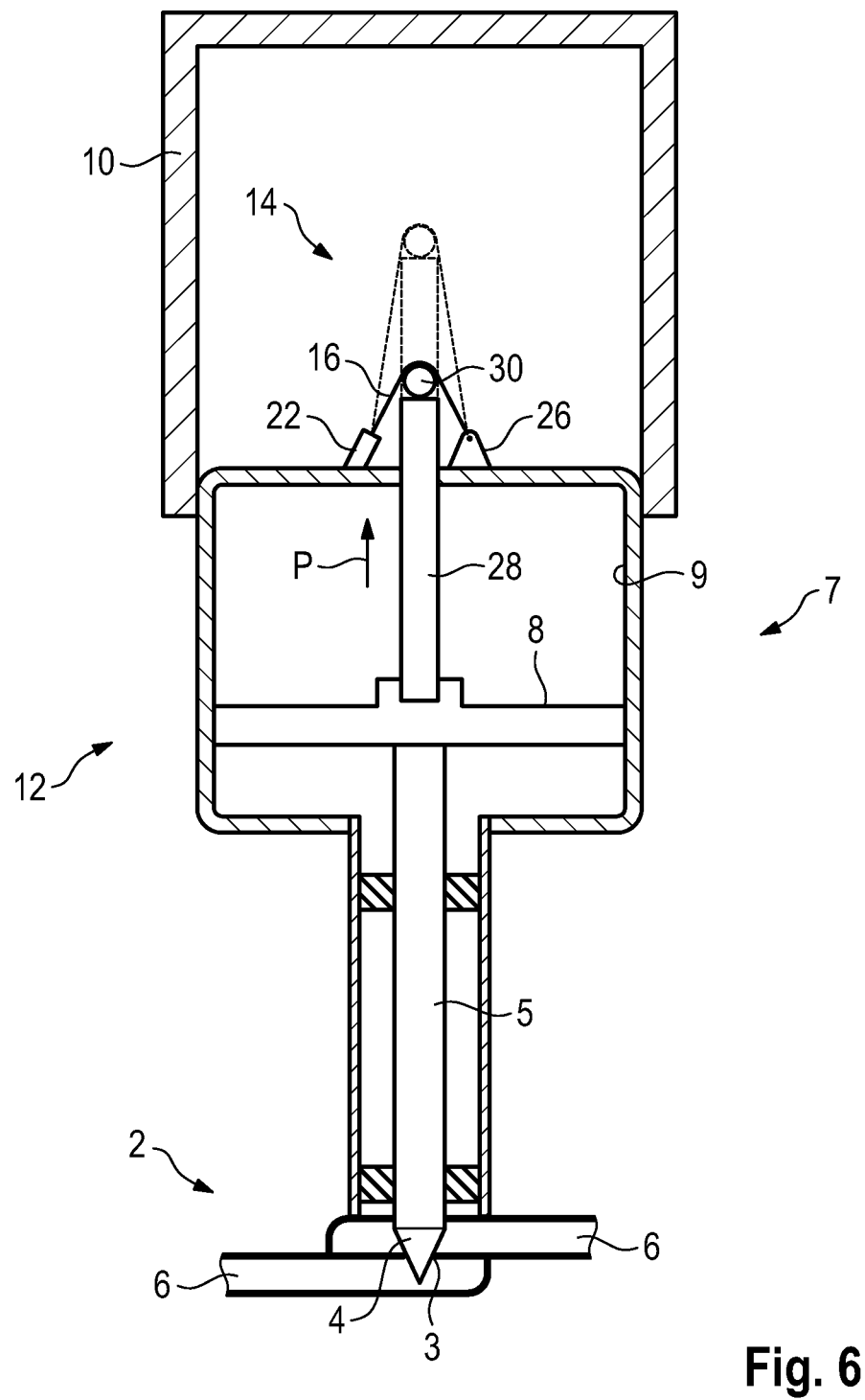
FIG. 6 shows a schematic sectional view of a valve drive according to a third embodiment of the invention.

FIG. 6 shows a third embodiment. The same reference numbers are used for the parts known from the first embodiment, and reference is made to the above explanations in this respect.

The essential difference between the third embodiment and the first two embodiments consists in that the two ends of the capacitor 16 are arranged substantially at the same level and the force transmission element 30 engages the capacitor 16 at the center.

When the force transmission element 30 is adjusted upward in the direction of the arrow P, the two legs of the capacitor 16 are elongated evenly.

The plug 22 is oriented obliquely upward here, so that the capacitor 16 is led out of the plug 22 upward in an optimum fashion.

In all embodiments, suitable engagement edges or deflection surfaces may be provided on the plug 22, so that the capacitor 16 is prevented from bending at a sharp angle. The same is applicable to the suspension point 26.

It is basically also possible to fix the plug 22 and also the suspension point 26 so as to be rotatable, so that the capacitor 16 can orient itself in an optimum fashion there without kinking or bending.

Figure 7:
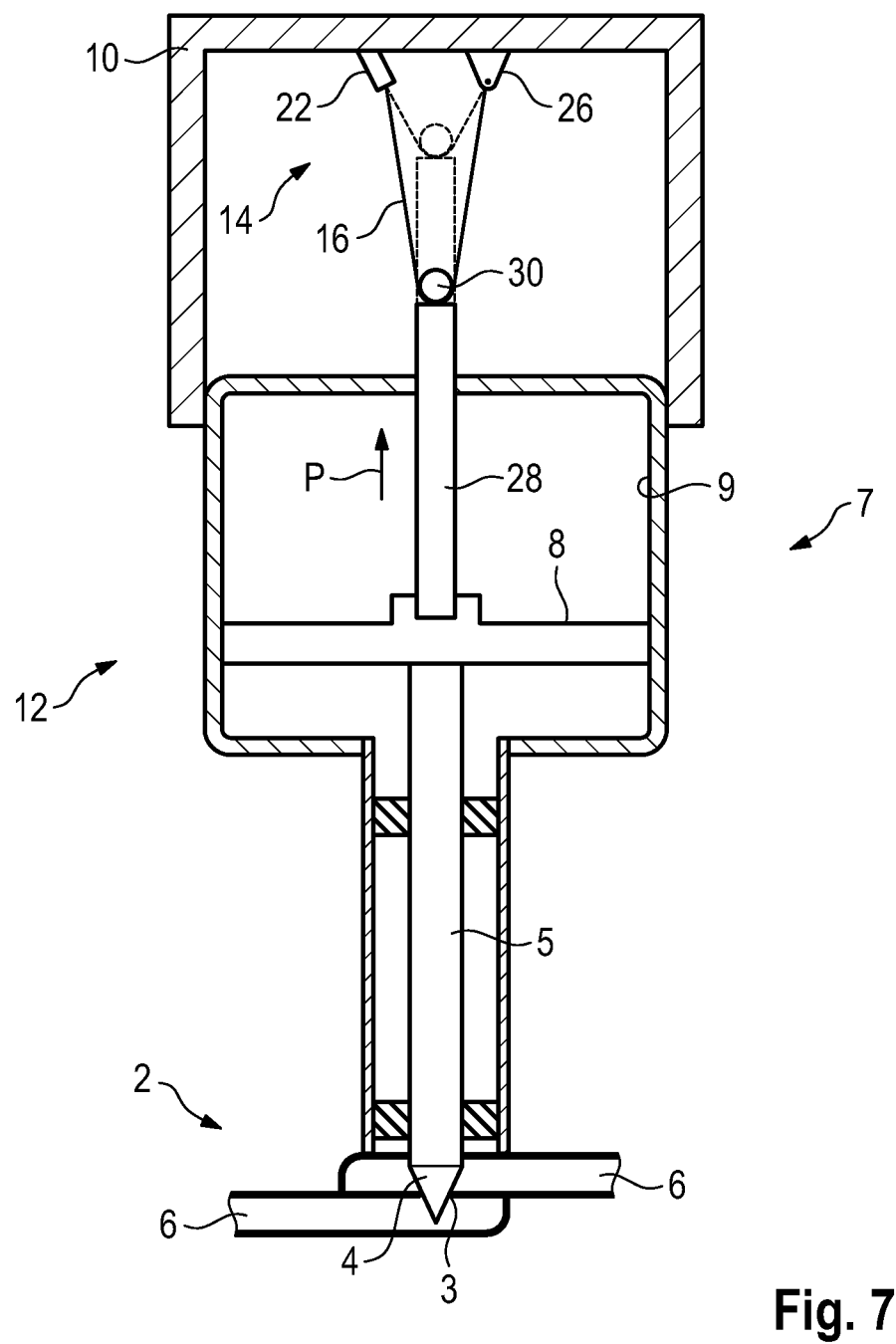
FIG. 7 shows a variant of the embodiment shown in FIG. 6.

FIG. 7 illustrates a variant of the embodiment shown in FIG. 6. The same reference numbers are used for the parts known from the preceding embodiments, and reference is made to the above explanations in this respect.

The difference between the variant embodiment according to FIG. 7 and the embodiment of FIG. 6 consists in that in the variant embodiment according to FIG. 7 the capacitor 16 is elongated when the valve 2 is closed. In the embodiment according to FIG. 6, on the other hand, the capacitor 16 is elongated when the valve 2 is opened.

In the variant embodiment according to FIG. 7, the force transmission element 30 is a roller which is hung in on the inner surface of the strip-shaped capacitor 16. In this way, a tensile force directed from the top down can be exerted on the capacitor.

Figure 8:
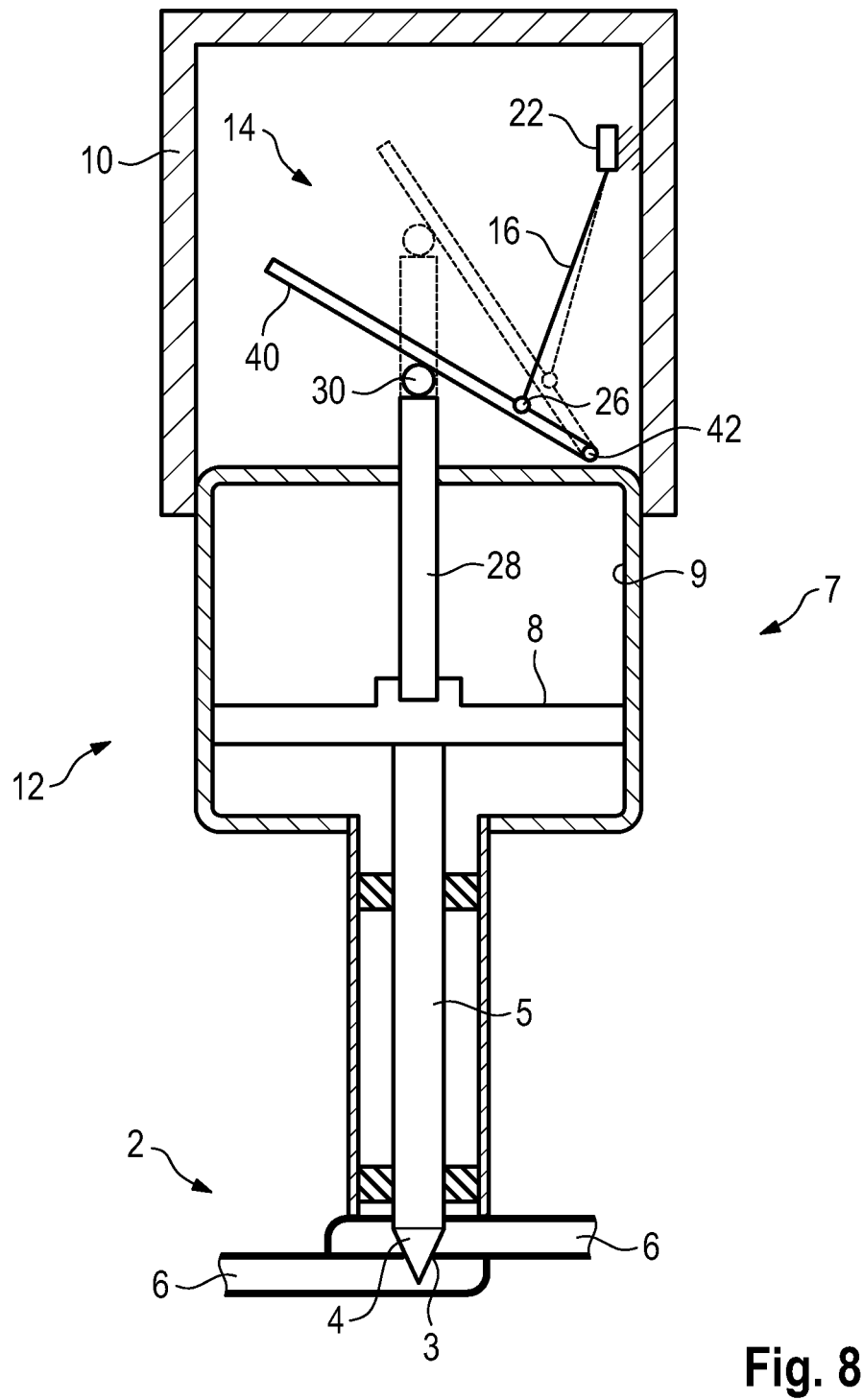
FIG. 8 shows a schematic sectional view of a valve drive according to a fourth embodiment of the invention.

FIG. 8 shows a fourth embodiment. The same reference numbers are used for the parts known from the preceding embodiments, and reference is made to the above explanations in this respect.

The essential difference between the fourth embodiment and the preceding embodiments consists in that in the fourth embodiment, a deflection lever 40 is arranged between the lifting element 28 and the capacitor 16. The deflection lever serves to transform the travel of the lifting element 28 into an elongation, which is smaller here, of the capacitor 16.

Depending on the desired geometric conditions, it is basically also possible to use the deflection lever 40 for transforming the travel of the lifting element 28 into a larger elongation of the capacitor 16.

Figure 9:
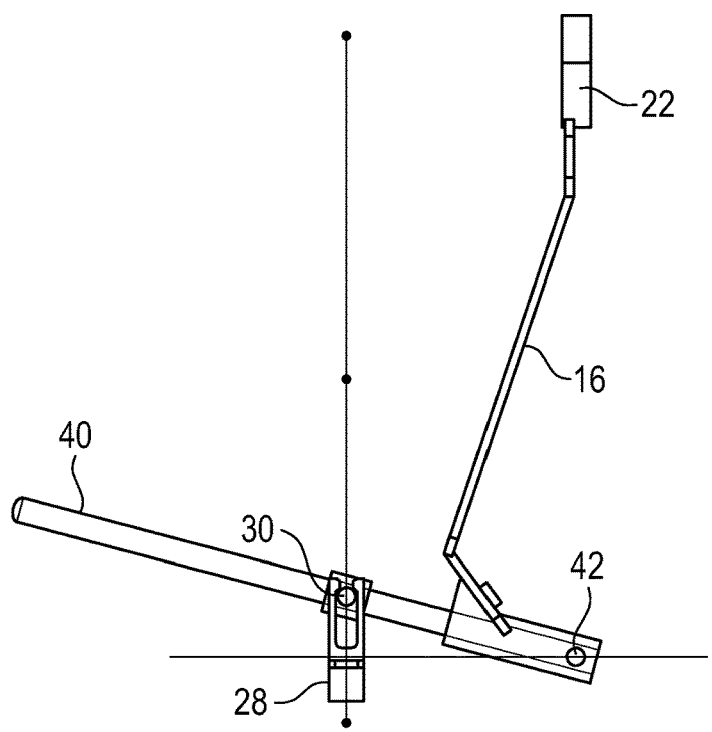
FIG. 9 shows a detail view of the deflection lever used in the fourth embodiment, in a first position.
Figure 10:
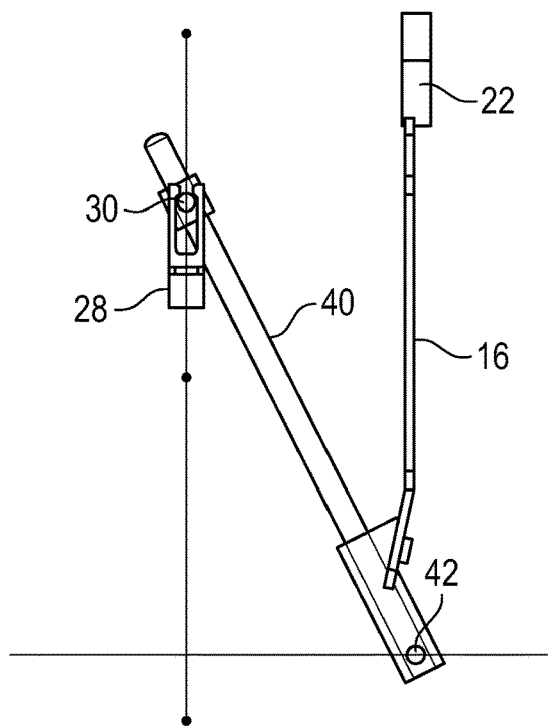
FIG. 10 shows the deflection lever of FIG. 9 in a second position.

The deflection lever 40 is mounted to a bearing spindle 42 for rotation within the control head 10, and the capacitor 16 is connected with the deflection lever 40 at a small distance from the bearing spindle 42 (see also FIGS. 9 and 10).

For a coupling between the deflection lever 40 and the lifting element 28, a force transmission element 30 is provided here again, which is configured as a slide. The slide 30 is seated on the deflection rod 30 (at least almost) free of play and, depending on the position of the deflection lever 40, it slides thereon in the axial direction.

A further difference between the fourth embodiment and the preceding embodiments consists in that in the fourth embodiment, the capacitor 16 is elongated when the valve element is in the closed position. In the first to third embodiments, this is the reverse; the capacitor 16 is at its maximum elongation when the valve element 4 is opened to its maximum extent. However, depending on the installation conditions, this may also be selected differently.

Figure 11:
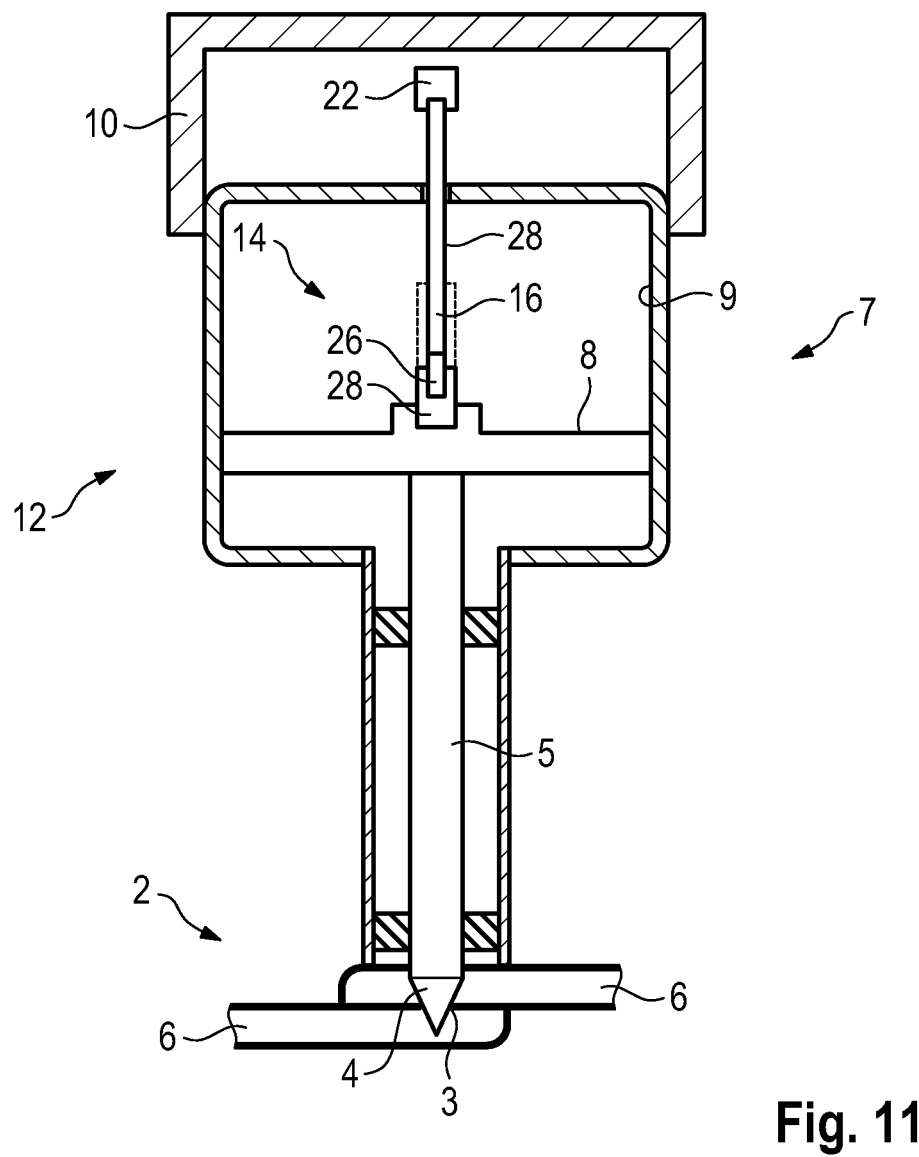
FIG. 11 shows a schematic sectional view of a valve drive according to a fifth embodiment of the invention.

FIG. 11 shows a fifth embodiment. The same reference numbers are used for the parts known from the preceding embodiments, and reference is made to the above explanations in this respect.

In the fifth embodiment, that end of the capacitor 16 which is adjusted is arranged inside the actuator 7. For this purpose, the lifting element 28 is constructed to be very short, so that the capacitor 16 is almost directly coupled to the piston 8.

The other end of the capacitor 16 is arranged within the control head 10.

In the fifth embodiment, the elongation of the capacitor 16 is directly proportional to the adjustment of the valve element 4.

Figure 12:
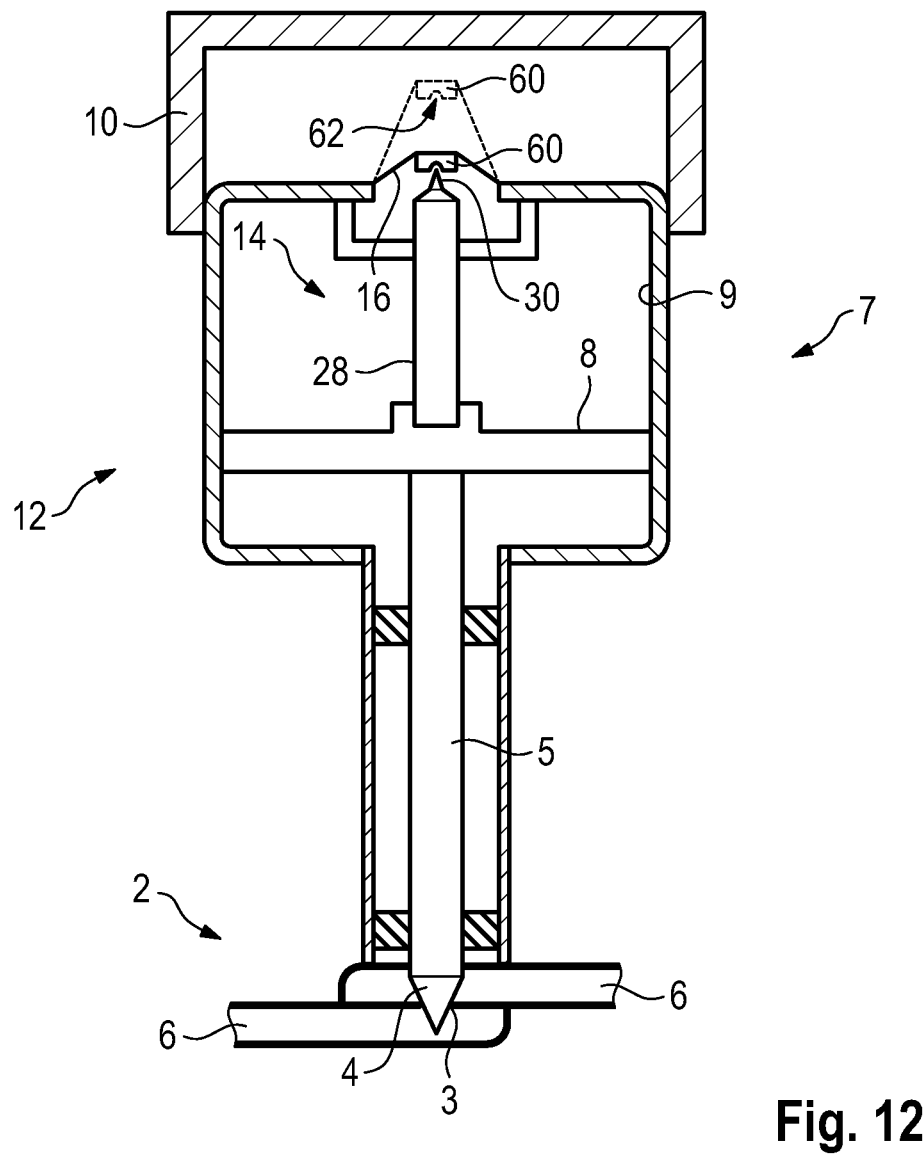
FIG. 12 shows a schematic sectional view of a valve drive according to a sixth embodiment of the invention.

FIG. 12 shows a sixth embodiment. The same reference numbers are used for the parts known from the preceding embodiments, and reference is made to the above explanations in this respect.

The sixth embodiment is based on the fourth embodiment. The difference from the fourth embodiment consists in that the capacitor 16 is provided with an abutment 60 which is provided with a conical opening 62 on the side facing the lifting element 28. The force transmission element 30, which is in the form of a needle here, engages into the opening 62. That is, the abutment 60 is supported on the lifting element 28 in the manner of a compass needle.

The use of a needle-shaped force transmission element 30 together with the abutment 60 makes sure that any rotation of the lifting element 28 about its longitudinal axis will not be transferred to the capacitor 16. It is therefore not necessary to use a separate anti-rotation device for the lifting element 28.

FIGS. 13 to 15 and 15*a* show a variant of the sixth embodiment. The same reference numbers are used for the parts known from the preceding embodiments, and reference is made to the above explanations in this respect.

The difference between the variant embodiment shown in FIGS. 13 to 15 and 15*a* and the sixth embodiment consists in that in the variant embodiment, no strip-shaped capacitor is used, but a substantially circular capacitor. Here, the abutment 60 is arranged in the center of the circle defined by the capacitor 16, and the periphery 66 of the capacitor is fixed to the valve drive 12 by means of a suitable holding ring (not illustrated here).

The space below the capacitor 16 is vented to the environment here by an opening (not illustrated). This ensures that neither an excess pressure nor a negative pressure will build up below the capacitor 16 when the abutment 60 is adjusted.

Alternatively, it may also be provided that the capacitor 16 seals the space from the actuator 7 in a pressure-tight manner. In this case, the displacement sensor 14 may be used as a combined displacement and pressure sensor since the ratio of internal pressure to external pressure also results in a deformation of the capacitor 16, which can be detected by the controller 24 and evaluated.

Figure 15:
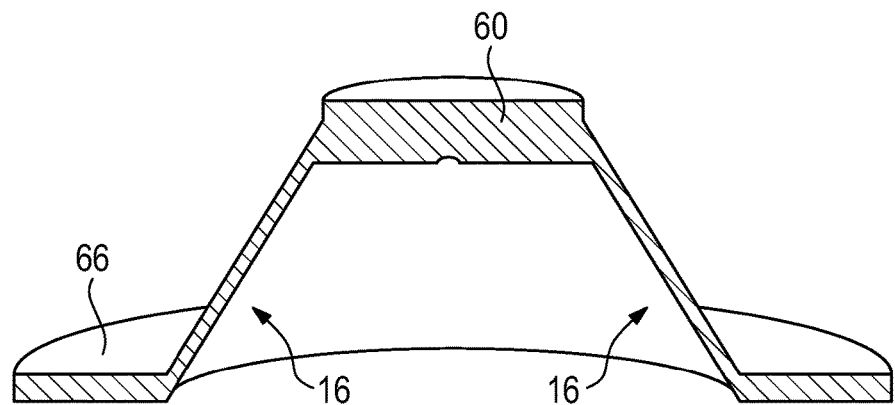
FIG. 15 shows a perspective sectional view of the film used in the valve drive of FIG. 13.
Figure 15A:
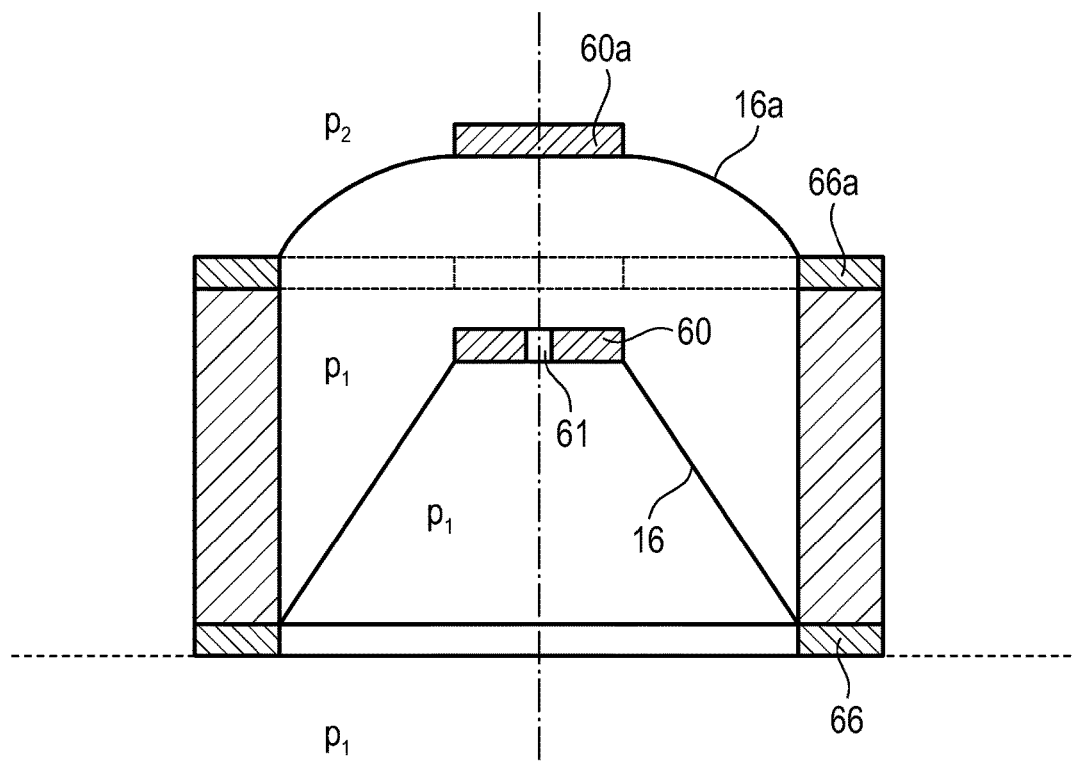
FIG. 15a shows a schematic section of an embodiment with a combined displacement and pressure sensor.

One exemplary embodiment including a combined displacement and pressure sensor is shown in FIG. 15*a*. Visible in the abutment is an opening 61 through which the space below the lower capacitor 16 is in communication with the space above this capacitor; in this way, the same pressure P1 prevails in both spaces.

The space above the lower capacitor 16 is sealed from the outer environment by a second capacitor 16*a*. For this reason, the second capacitor 16*a* is exposed to the pressure differential between the pressure P1 below the capacitor 16*a* and an external pressure P2. The deformation of the capacitor 16*a* therefore allows a conclusion to be drawn about the internal pressure within the drive of the valve.

Figure 13:
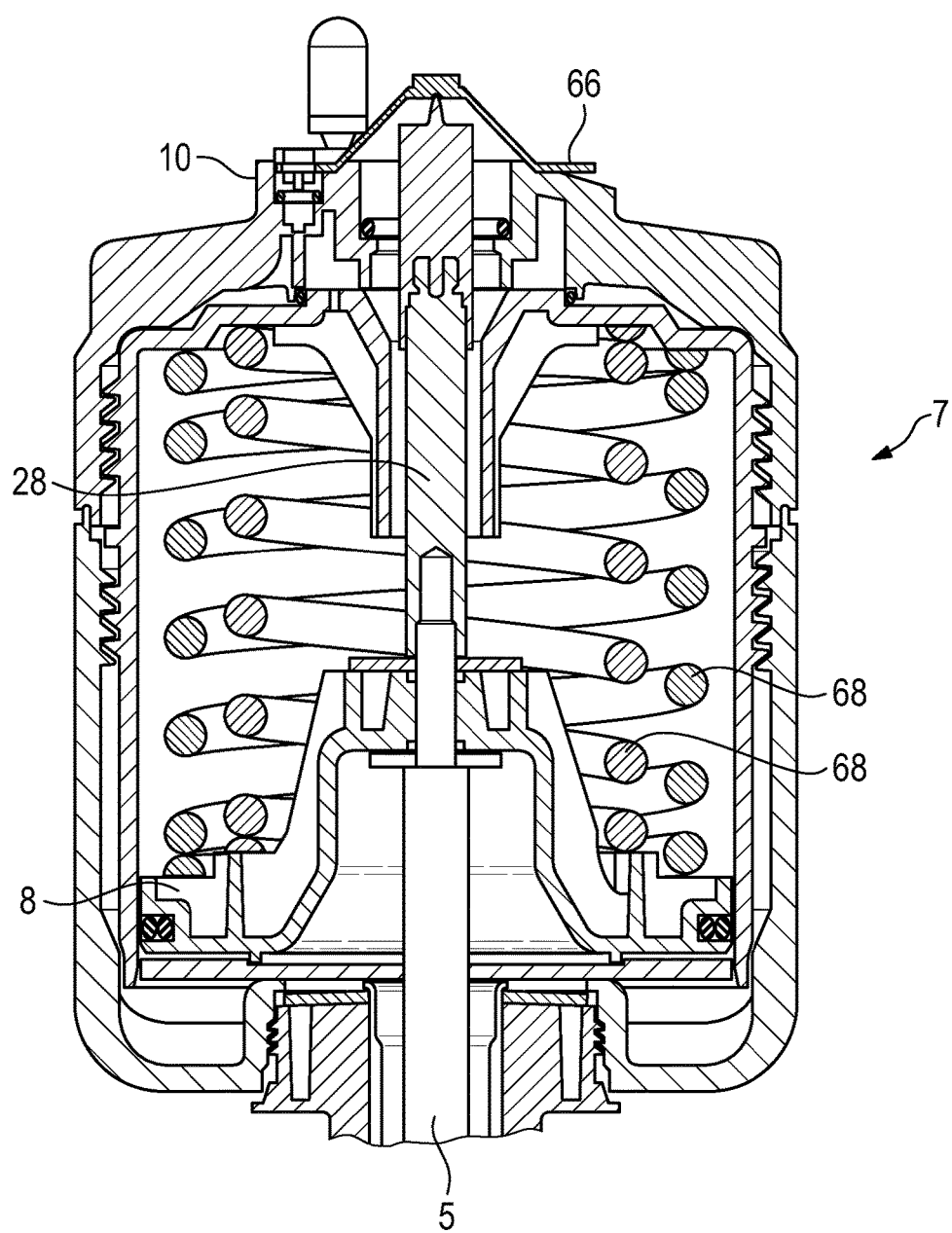
FIG. 13 shows a variant embodiment of the valve drive of FIG. 12.
Figure 14:
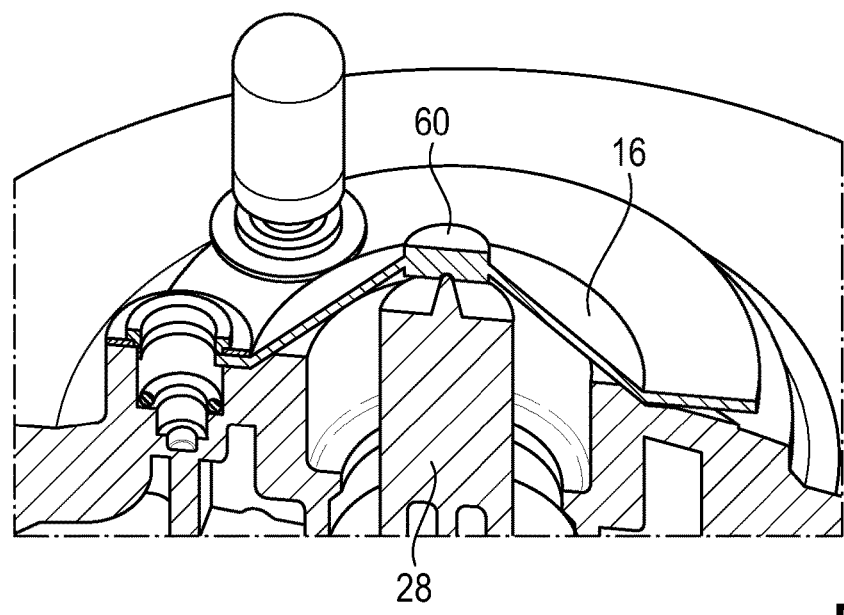
FIG. 14 shows an enlarged, perspective sectional view of the valve drive of FIG. 13 in the area of the displacement sensor.

Also visible in FIG. 13 are two springs 68 which act upon the piston 8. Depending on the particular design of the valve drive 12, the springs 68 may be arranged above or below the piston 8.

Figure 16:
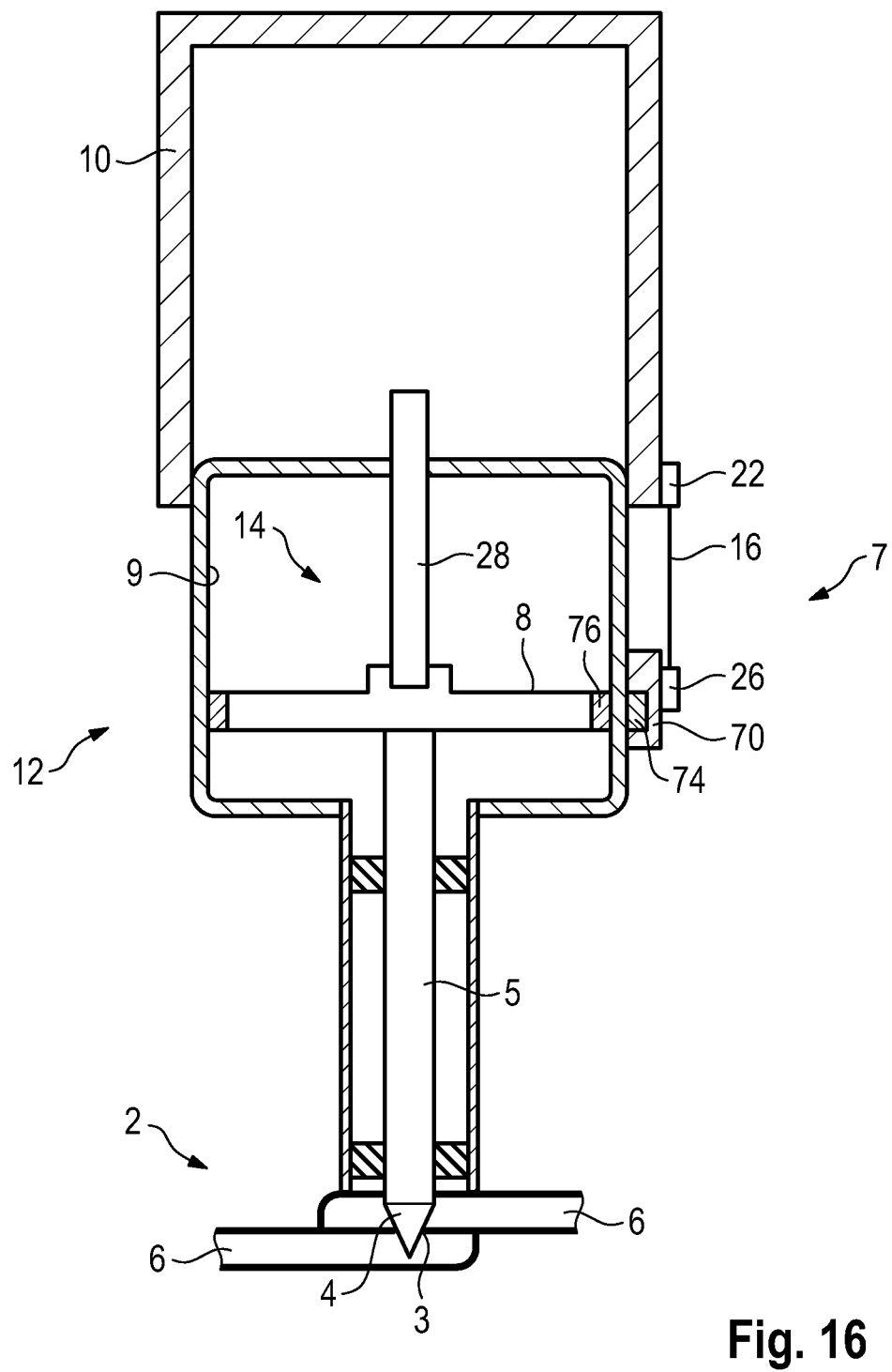
FIG. 16 shows a schematic sectional view of a valve drive according to a seventh embodiment of the invention.
Figure 17:
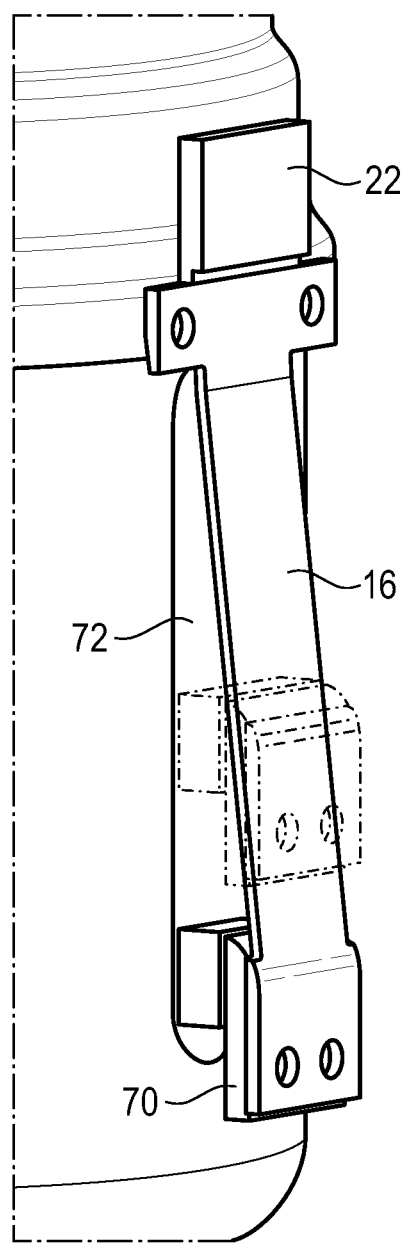
FIG. 17 shows a detail of the valve drive of FIG. 16 on an enlarged scale.

FIGS. 16 and 17 show a seventh embodiment. The same reference numbers are used for the parts known from the preceding embodiments, and reference is made to the above explanations in this respect.

The difference between the seventh embodiment and the preceding embodiments consists in that in the seventh embodiment, the capacitor 16 is arranged outside the valve drive 12.

The capacitor 16 is fixed in place here at one end thereof by means of the plug 22. The other end of the capacitor 16, which is in the form of an elongate strip here again, is attached to a carriage 70 here. The carriage is guided in a guide 72 on the outer surface of the actuator parallel to the adjustment direction of the piston 8 (see also FIG. 16).

The carriage 70 is provided with a member 74 which is magnetically coupled to a ring 76 which extends along the outer periphery of the piston 8. The member 74 may, e.g., be a magnet, and the ring 76 may be made of metal. Since the housing shell 9 of the actuator 7 is thin-walled and not made of a ferromagnetic material, the carriage 70 is entrained when the piston 8 is adjusted inside the actuator 7. In the process, the length of the capacitor varies accordingly.

In this embodiment, the lifting element is the piston 8 directly.

The special advantage of the seventh embodiment consists in that the displacement sensor 14 can be retrofitted with comparatively little effort. It is only necessary to provide the piston 8 with the metal ring 76, and the displacement sensor 14 with the carriage 70 has to be mounted on the outer surface of the actuator 7.

Figure 18:
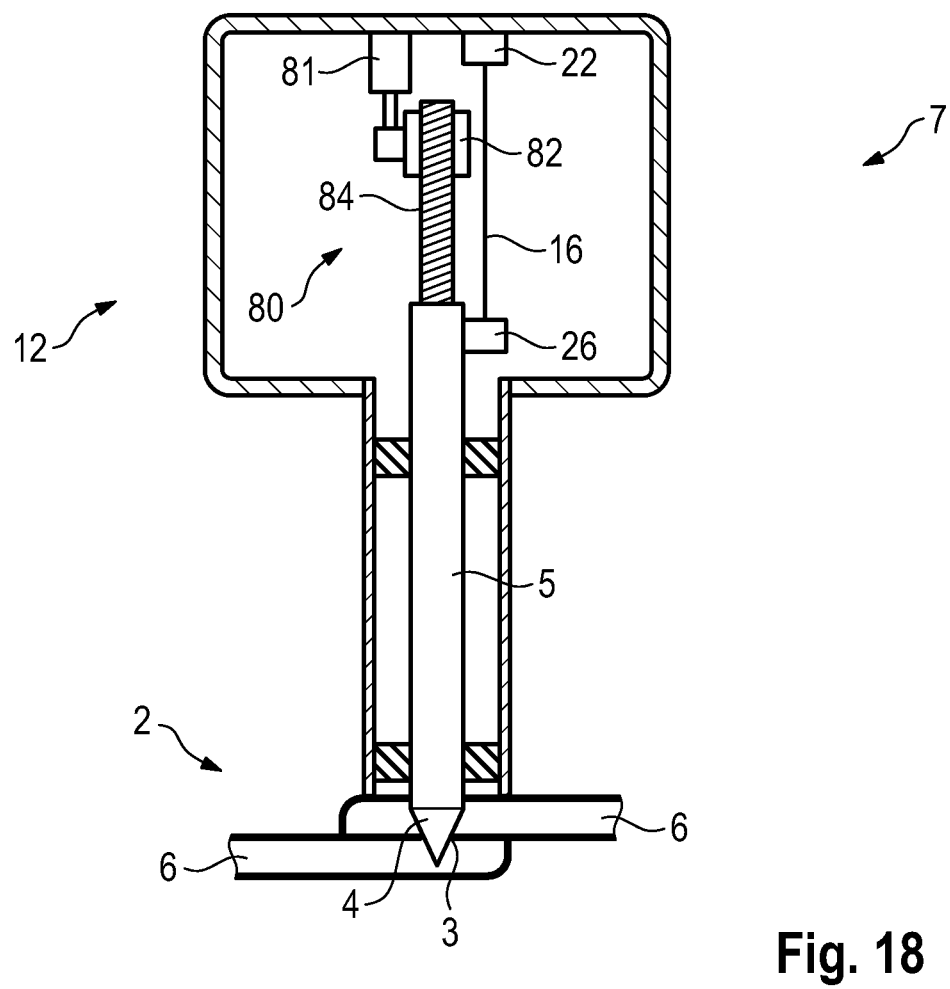
FIG. 18 shows a schematic sectional view of a valve drive according to an eighth embodiment of the invention.

FIG. 18 shows an eighth embodiment. The same reference numbers are used for the parts known from the preceding embodiments, and reference is made to the above explanations in this respect.

The essential difference between the eighth embodiment and the preceding embodiments consists in that in the eighth embodiment, one end of the capacitor 16 is attached to the valve spindle 5. The latter is adjusted by a linear drive 80.

The linear drive 80 is fastened to a component which follows the linear movement, and to a stationary component. In particular, the linear drive 80 includes an electric motor 81 which drives a spindle nut 82 that is fixed in the axial direction. The spindle nut 82 is arranged on a spindle rod 84, adjusting the latter in the axial direction when the spindle nut 82 is rotated.

In the eighth embodiment, too, the elongation of the capacitor 16 is proportional to the adjustment of the lifting element 5, which here is the valve spindle 5 directly.

In all of the embodiments provision may be made that the controller 24 has a learning mode, in which the valve drive is reciprocated once or several times between its two end positions while the controller 24 records the resultant course of the capacitance of the capacitor 16 at the same time.

It may also be provided that the controller 24 repeats this learning process at regular intervals in order to update the curve of capacitance versus the position of the lifting element, for example.

A special advantage of the displacement sensor 14 resides in that the evaluation of the sensor signal requires almost no power, since merely a capacitance is evaluated. The energy input required for this is very low.

The invention claimed is:

1. A valve drive for actuating a valve, comprising a lifting element which shifts upon an actuation of the valve, and a displacement sensor by means of which the position of the lifting element can be detected, characterized in that the displacement sensor includes at least one elastically deformable dielectric film which is provided with at least two electrodes, the film being deformed by an adjustment of the lifting element, wherein a force transmission element is provided which engages only one side of the film and wherein the force transmission element is a rotatable roller.

2. The valve drive according to claim 1, characterized in that the film is firmly clamped at both ends and the lifting element engages the film between the ends.

3. The valve drive according to claim 1, characterized in that the force transmission element is mounted to the lifting element.

4. The valve drive according to claim 1, characterized in that an anti-rotation device is provided for the force transmission element.

5. The valve drive according to claim 4, characterized in that the anti-rotation device engages the force transmission element.

6. The valve drive according to claim 4, characterized in that the anti-rotation device engages the lifting element.

7. The valve drive according to claim 1, characterized in that the film is arranged obliquely to the direction of adjustment of the lifting element.

8. The valve drive according to claim 1, characterized in that the film has a plug mounted thereto which extends at right angles to the direction of adjustment of the lifting element.

9. The valve drive according to claim 1, characterized in that the film has a plug mounted thereto which extends substantially parallel to the direction of adjustment of the lifting element.

10. The valve drive according to claim 1, characterized in that it includes an actuator and a control head mounted thereto.

11. The valve drive according to claim 10, characterized in that the lifting element is an extension of a valve spindle and the film is arranged inside the control head.

12. The valve drive according to claim 10, characterized in that the lifting element is a valve spindle and one end of the film is coupled to the valve spindle inside the actuator.

13. The valve drive according to claim 1, characterized in that the displacement sensor includes a stack of dielectric films.

14. The valve drive according to claim 1, characterized in that a pressure measurement sensor is integrated which includes at least one dielectric film.

* * * * *